US009956701B2

(12) United States Patent
Summer et al.

(10) Patent No.: US 9,956,701 B2
(45) Date of Patent: May 1, 2018

(54) PAYLOAD DEPLOYMENT SYSTEM

(71) Applicant: HARRIS CORPORATION, Melbourne, FL (US)

(72) Inventors: Matthew D. Summer, Melbourne, FL (US); Paul M. Bosscher, West Melbourne, FL (US)

(73) Assignee: Harris Corporation, Melbourne, FL (US)

(*) Notice: Subject to any disclaimer, the term of this patent is extended or adjusted under 35 U.S.C. 154(b) by 126 days.

(21) Appl. No.: 15/145,444

(22) Filed: May 3, 2016

(65) Prior Publication Data
US 2017/0320226 A1 Nov. 9, 2017

(51) Int. Cl.
B26F 3/08 (2006.01)
B26F 3/02 (2006.01)

(52) U.S. Cl.
CPC ............. B26F 3/08 (2013.01); B26F 3/02 (2013.01); B64C 2201/128 (2013.01)

(58) Field of Classification Search
CPC ..... B26F 3/06; B26F 3/08; B26D 7/10; Y10T 83/293
USPC ............................................ 30/140; 219/221
See application file for complete search history.

(56) References Cited

U.S. PATENT DOCUMENTS

| | | | | |
|---|---|---|---|---|
| 5,308,114 A | * | 5/1994 | Williams | B60R 19/545 219/202 |
| 5,783,800 A | * | 7/1998 | Thompson | A45D 1/00 132/201 |
| 5,824,984 A | * | 10/1998 | Morrow | B23K 11/22 140/139 |
| 7,845,283 B2 | | 12/2010 | Finneral et al. | |
| 7,992,306 B2 | * | 8/2011 | Standiford | B62B 27/00 30/140 |
| 8,103,212 B1 | | 1/2012 | Pezeshkian et al. | |
| 8,371,203 B2 | * | 2/2013 | Watson | F41H 11/24 89/1.13 |
| 9,094,082 B1 | | 7/2015 | Holz et al. | |

* cited by examiner

Primary Examiner — Mark C Hageman
(74) Attorney, Agent, or Firm — Fox Rothschild LLP; Robert J. Sacco; Carol E. Thorstad-Forsyth

(57) ABSTRACT

Payload deployment system (400) comprises a payload deployment device (402) and a payload deployment structure (406) comprising a frame (102) having a first end, a second end, and a body extending from the first end toward the second end. The frame includes an aperture (106) located along a length of the body, wherein the aperture extends from a first surface of the frame to a second surface of the frame. A heating element (116) is located along a portion of an edge of the aperture, wherein the heating element is configured to be selectively electrically energized. The frame further includes a mounting portion (104) wherein the payload deployment structure is connected to the payload deployment device via the mounting portion.

20 Claims, 5 Drawing Sheets

US 9,956,701 B2

PAYLOAD DEPLOYMENT SYSTEM

BACKGROUND OF THE INVENTION

Statement of the Technical Field

The inventive arrangements relate to robotic devices, and more particularly to robotic devices which are capable of deploying payload items.

Description of the Related Art

There is a growing need to deploy a variety of payloads, such as, for example, cameras, communication sensor and parcels, from robotic devices and unmanned systems. It is common for payload deployment to be performed manually by human personnel and without the use of unmanned system robotics. However, this convention method of manual deployment is often not cost effective and can place the person deploying the payloads in harm's way. For this reason, the use of robotic devices and unmanned systems for the deployment of payloads can be highly desirable. Still, such arrangements require some apparatus to facilitate carriage of the payload and eventual deployment when the payload is delivered to a desired location.

Conventional methods for deploying payloads from a robotic or unmanned system are not entirely satisfactory. A grasping device associated with a robotic arm could be used for this purpose but this limits the availability of the arm for other purposes. Also, since a robotic arm associated with a UAV will typically have only a single grasping device, the number of payload items which can be carried is somewhat limited. Conventional mechanical release mechanisms can be used in deploying payloads but such systems can be costly and complicated. The relative complexity of such systems can also make them more prone to failure and can require maintenance to keep them in satisfactory operating condition. Under adverse weather conditions involving rain, snow and ice, such systems may not operate consistently and reliably. Finally, conventional mechanical payload carriage and release systems can also involve the addition of unnecessary amounts of weight or mass to the unmanned system.

SUMMARY OF THE INVENTION

Embodiments of the invention concern a payload deployment system. The system is comprised of a payload deployment device and a payload deployment structure. The payload deployment structure is comprised of a frame having a first end, a second end, and a body extending from the first end toward the second end. The frame also includes one or more apertures located along a length of the body, wherein the aperture extends from a first surface of the frame to a second surface of the frame. A heating element is located along a portion of an edge of each aperture. The heating element is configured to be selectively electrically energized. The frame further includes a mounting portion wherein the payload deployment structure is connected to the payload deployment device via the mounting portion.

Embodiments also include a payload deployment structure. The payload deployment structure is comprised of a frame having a first end, a second end, and a body extending from the first end toward the second end. The frame includes a mounting portion comprising a mechanical structure which is configured to engage a portion of a robotic vehicle such that the frame is supported on the robotic vehicle. One or more apertures are located along a length of the body, wherein the aperture extends from a first surface of the frame to a second surface of the frame. Each of these apertures has a heating element located along a portion of an edge of the aperture, wherein the heating element is configured to be selectively electrically energized. An electrical interface is provided and configured to receive one or more electrical signals from the robotic vehicle to facilitate selectively electrically energizing the heating element.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
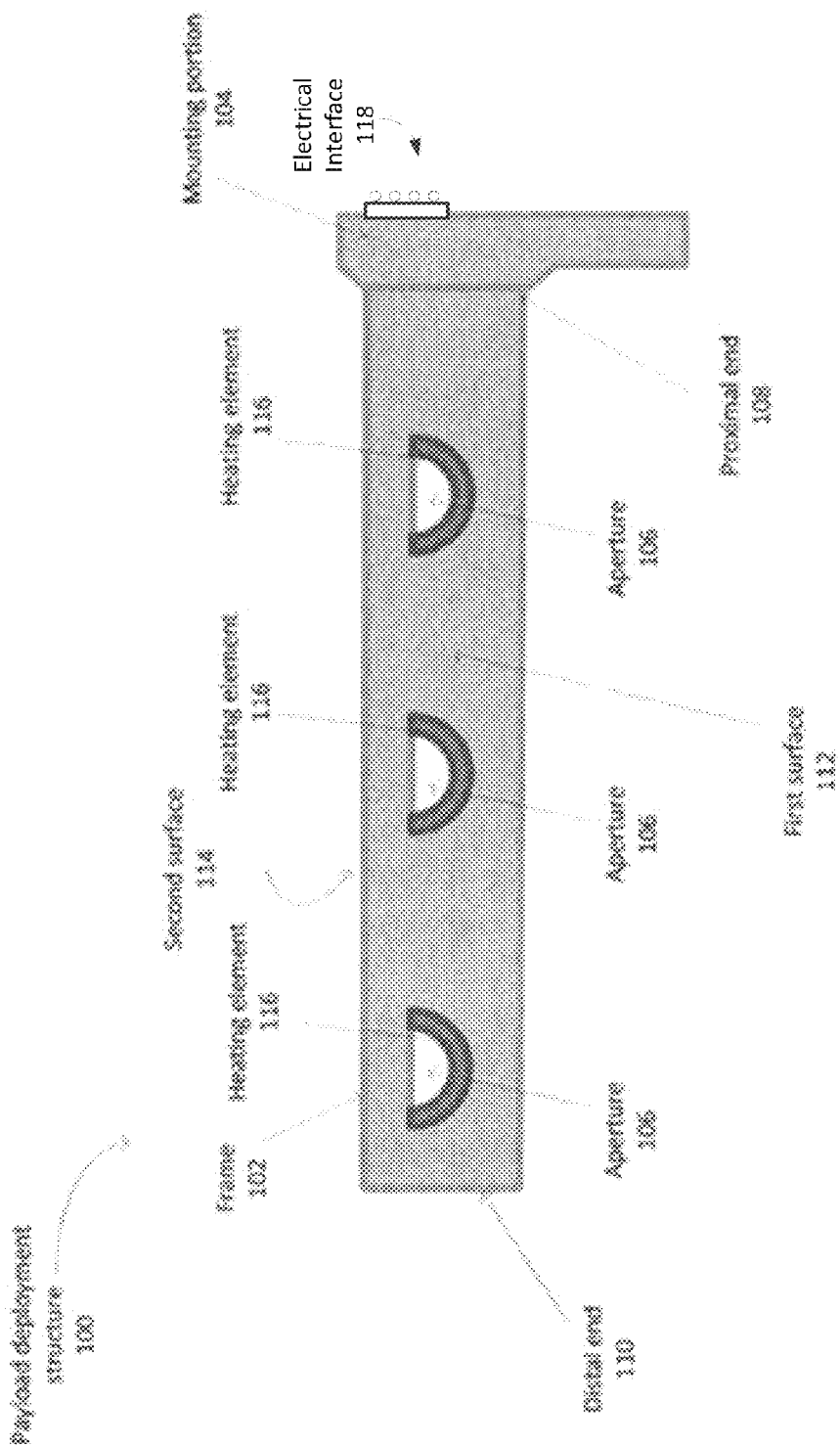
FIG. 1 illustrates an example payload deployment structure that is useful for understanding an embodiment.

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. As used herein, the term "comprising" means "including, but not limited to."

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. However, the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

The following terms shall have, for purposes of this application, the respective meanings set forth below:

A "payload" refers to an item to be transported and deployed at a certain location. Example payloads may include, without limitation, a communications device such as a radio transmitter and/or receiver, a parcel, a sensor, a camera, a charger or a consumer product.

An "unmanned system" refers to a device or vehicle without a human operator on board. Example unmanned systems may include, without limitation, unmanned ground vehicles (UGVs), unmanned aerial vehicles (UAVs), unmanned surface vehicles (USVs), unmanned underwater vehicles (UUVs), driverless cars, driverless trains and/or the like.

A "manned system" refers to a device or vehicle having a human operator on board.

A "payload deployment device" refers to a manned system or an unmanned system for transporting one or more payloads.

A "payload deployment structure" refers to a structure from which one or more payloads are deployed. A payload deployment structure may be attached or connected to a payload deployment device.

A "payload deployment system" refers to a payload deployment device and a payload deployment structure.

FIG. 1 illustrates an example payload deployment structure according to an embodiment. As illustrated by FIG. 1, the payload deployment structure 100 includes a frame 102 having a mounting portion 104 and one or more apertures 106. The frame 102 has a proximal end 108 and a distal end 110. The frame 102 may be fabricated from any suitable material such as, for example, metal, composite materials and/or the like. In certain embodiments, a frame 102 may be fabricated from a high strength material.

Figure 3:
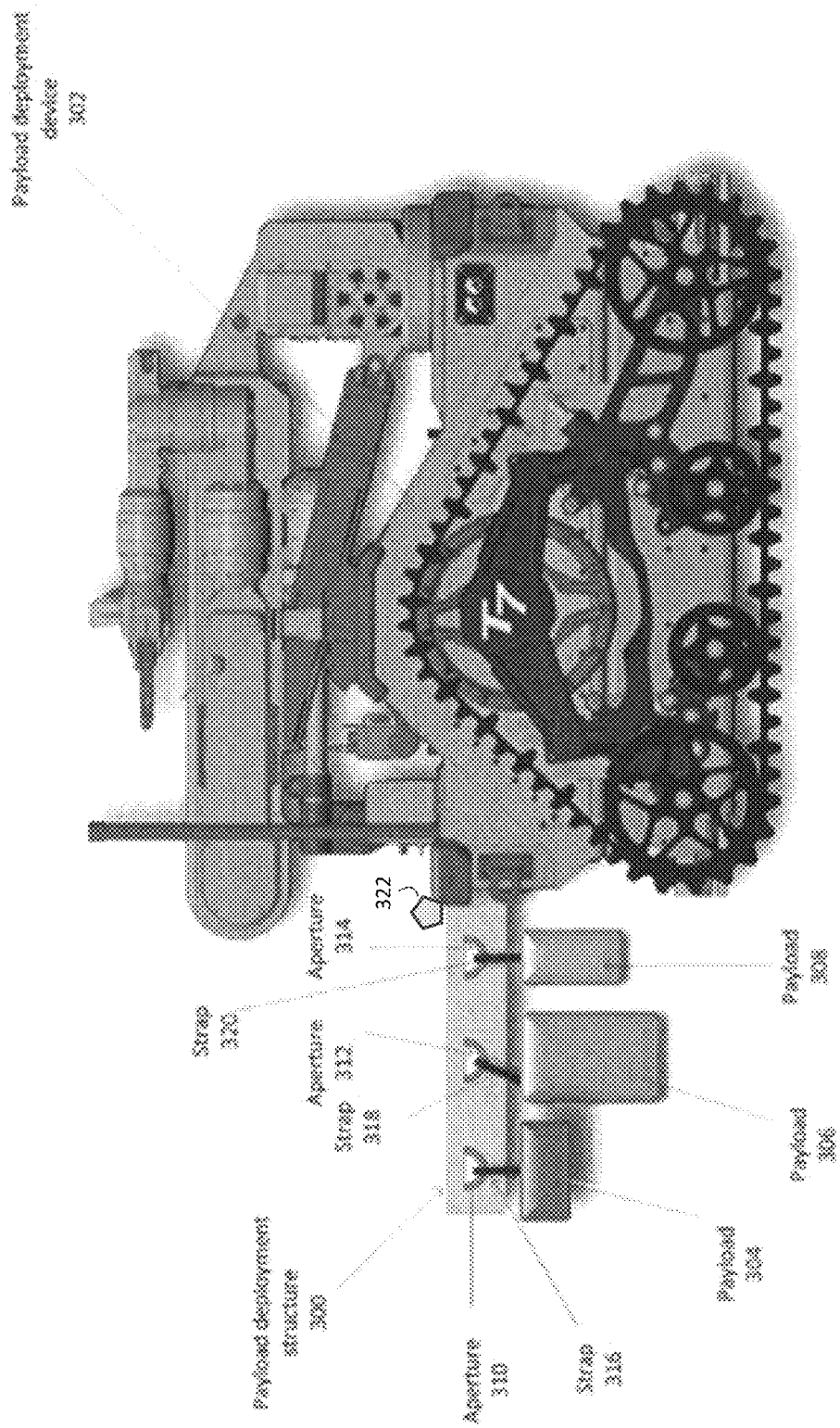
FIG. 3 is a side view of a robotic vehicle with an exemplary payload deployment system mounted thereon according to an embodiment.

In an embodiment, a mounting portion 104 allows connection of the frame 102 to a payload deployment device, such as an unmanned or robotic system. A mounting portion 104 may be a flange, a rim or other mechanical connector. In various embodiments, a payload deployment structure 100 may be attached or connected to a front or rear portion of a payload deployment device. In other embodiments, a payload deployment structure 100 may be attached or connected to another portion of a payload deployment device. FIG. 3 illustrates a payload deployment structure 300 connected to a payload deployment device 302 according to an embodiment. In some scenarios, the mounting portion 104 can include an electrical interface 118 comprising one or more electrical contacts disposed thereon which will form electrical connections with corresponding electrical contacts on a payload deployment device 302 so as to provide electrical power to the payload deployment structure as hereinafter described. Alternatively, a separate electrical connector (not shown) can be connected to electrical components in the payload deployment structure 100. Such an electrical connector can be electrically connected to a mating connector on the payload deployment device 302 when the payload deployment structure is mounted on the payload deployment device as shown in FIG. 3. The separate electrical connector can be used to provide electric current to the payload deployment structure as explained below in further detail.

In an embodiment, the one or more apertures 106 are positioned along a length of the frame 102 between the proximal end 108 and the distal end 110. The apertures 106 may be positioned at a substantially equal distance from one another along the length of a frame. Alternatively, the spacing between apertures 106 may not be equidistant.

One or more of the apertures 106 extends from a first surface 112 of the frame 102 to a second surface 114 of the frame (e.g. an opposing second surface). One or more of the apertures 106 include a heating element 116 associated therewith. As shown in FIG. 1, the heating element can be positioned along at least a portion of an edge of each aperture. For example, a heating element 116 may be located along a bottom or lower edge of an aperture 106. Alternatively, a heating element 116 may be located along another edge or portion of an aperture 106.

Figure 2:
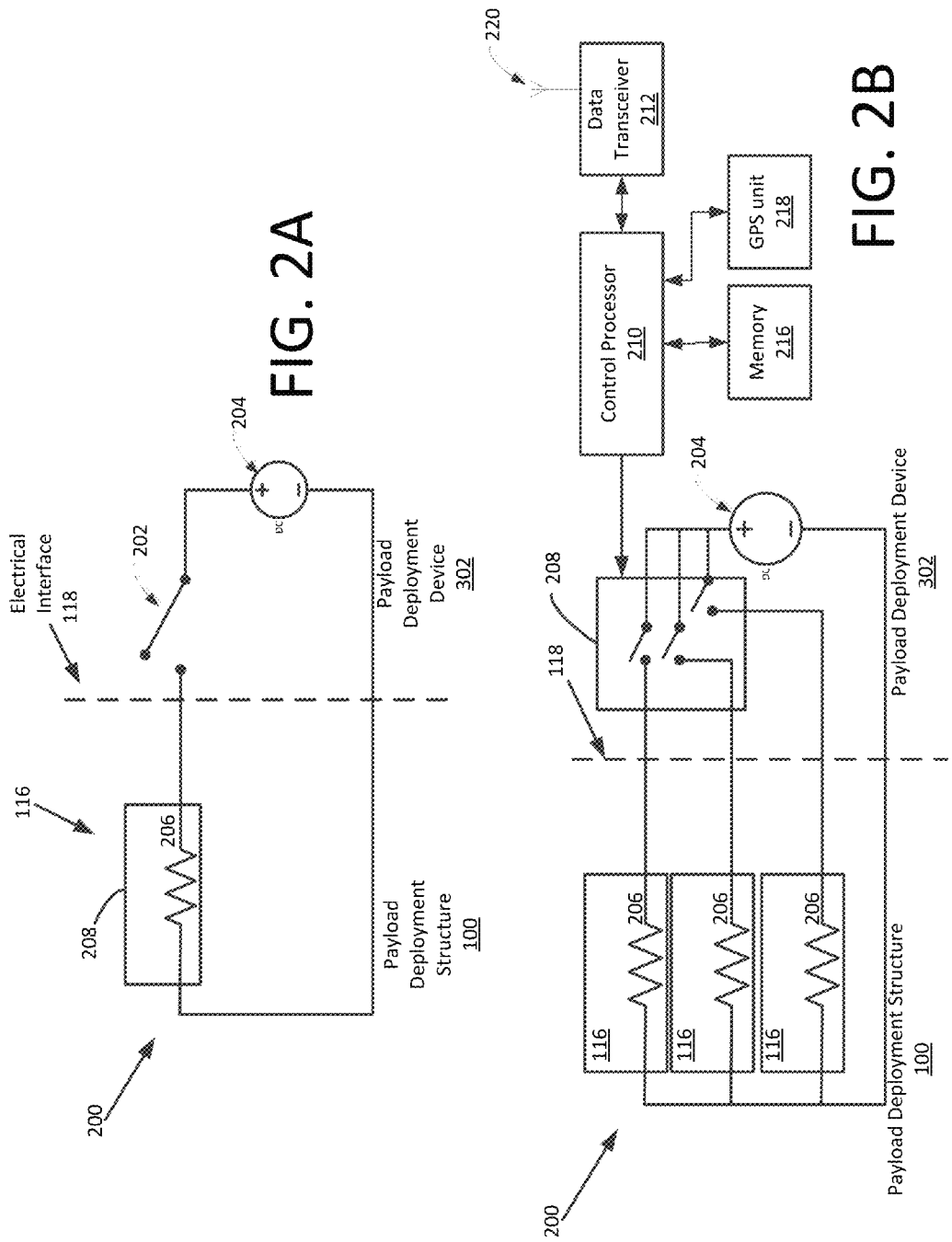
FIGS. 2A and 2B (collectively FIG. 2) illustrate example circuitry which can be used in conjunction with the payload deployment structure shown in FIG. 1.

A heating element 116 may comprise a portion of one or more electrical circuits such as those which are illustrated in FIG. 2. Each heating element 116 will generally include at least one electronic heating component 206 as shown in FIG. 2. The electronic heating component 206 can be comprised of a resistive type element which heats up rapidly and substantially when an electric current is flowing through the heating component. In some embodiments, the heating component 206 as described herein can be comprised of a wire, ribbon or strip formed of a metal alloy such as Nichrome 80/20 which is 80% nickel and 20% chromium. The heating elements 116 can include protective structure 208 which covers at least a portion of the electronic heating component to prevent the electronic heating component from being damaged do to abrasion or rough handling.

Referring now to FIG. 2A, an electronic heating component 206 as described herein can be selectively energized by applying electric current from a power source 204. The power source can be located in the payload deployment device 302 as shown. A heating component 206 may be selectively energized by using a current control device 202 provided on or remotely from the payload deployment structure 100. In FIG. 2A the current control device 202 is shown to be provided in a payload deployment device 302. However, it should be understood that in some embodiments, the current control device can instead be included in or on the payload deployment structure 100. An exemplary current control device which can be used for this purpose can be comprised of a relay, a switch, or a transistor. The current control device 202 can be used to selectively control the application of electric current to the electronic heating component 206 in response to control signals from the payload deployment device 302. The control device can cause current to be applied to the heating element for a period of time.

In some embodiments, a separate circuit similar to the one shown in FIG. 2A can be provided for each electronic heating component 206. However, FIG. 2B shows an embodiment in which a current control device 208 comprises a multiplexed switching arrangement which can selectively apply electric current to one or more of a plurality of different electronic heating components 206. A power source 204 used to supply the electric current can be provided in the payload deployment device 302 as shown. For example, power source can be a conventional battery. In some scenarios, the same battery that is used to power the payload deployment device 302 can also be used to apply the electric current to the heating elements as described herein.

As is known, a payload deployment device such as a UAV can include a control processor 210 to facilitate autonomous vehicle operations. The payload deployment device can also include a wired or wireless data transceiver 212 to facilitate receipt of command and control signals from a human operator at a remote control station. Control processors and wireless data transceivers are well known in the art and therefore will not be described here in detail. However, it should be understood that exemplary control processors which can be used for this purpose can include microprocessors, microcontrollers and/or any other suitable control circuitry. Similarly, the wireless data transceiver can include a suitable radio frequency transceiver and associated signal processing circuitry for receiving and processing command and control signals from the remote control station. The system can also include an antenna 220 coupled to the data transceiver to facilitate receiving and transmitting of radio signals.

In an embodiment, the current control device 208 which is used to selectively apply current to the electronic heating component 206 can be under the direct or indirect control of the control processor in the payload deployment device 302. For example, the control processor can be configured to cause current control device 208 to selectively activate one or more circuits when the payload deployment device 302 arrives at a predetermined location. In such a scenario, the payload deployment device can include a GPS unit 218 or other location determining device in communication with the control processor 210 so as to allow the control processor to determine whether it has arrived at a predetermined location for releasing a payload. Alternatively, the control processor 210 can be responsive to control signals received from the remote control station (not shown) which is used to control the payload deployment device to release a payload.

Although FIG. 1 illustrates apertures 106 and heating elements 116 as having a semi-circular shape, it is understood that apertures and heating elements having different shapes may be used within the scope of the disclosure. For example, apertures having a square, triangle, oval or other shape may be used. A heating element having an appropriate shape can be selected in accordance with the shape of the aperture. Similarly, although FIG. 1 illustrates apertures 106 having the same shape, it is understood that one or more apertures 106 of a frame 102 may have different shapes than one or more other apertures of the frame. In an embodiment, an aperture 106 and associated heating element 116 can have a generally concave shape to allow straps that are secured to the aperture and to a payload to contact a heating element 116 when secured. In various embodiments, a top portion of an aperture 106 may have a generally rounded configuration to prevent wear on the straps or to prevent the straps from snagging on the top portion of the aperture.

In an alternate embodiment, an aperture 106 may have a heating element 116 located on a top portion and a bottom portion of the aperture. For example, an aperture 106 may be a slot having a heating element 116 on a top portion and a bottom portion. When a strap is secured to a slot, a top portion of the strap may be in contact with a top portion of a heating element 116 while a bottom portion of the strap may be in contact with a bottom portion of the heating element.

In various embodiments, one or more payloads are secured to one or more apertures 106 using one or more straps. FIG. 3 illustrates an example payload deployment device 300 having a payload deployment structure 302 with three payloads 304, 306, 308 secured to three apertures 310, 312, 314 via straps 316, 318, 320. A strap 316, 318, 320 can be formed from a material that can be at least partially melted, burned or otherwise electrically severed by one or more heating elements. For instance, one or more straps 316, 318, 320 may be formulated from plastic, polymers, meltable vinyl, cotton and/or the like. Plastic zip-ties are examples of straps that may be used.

In an embodiment, a first portion of a strap 316, 318, 320 is secured to a payload in any suitable manner. A second portion of a strap 316, 318, 320 is secured to one or more apertures 310, 312, 314. A strap 316, 318, 320 may be secured to an aperture 310, 312, 314 such that a portion of the strap is in contact with a heating element of the aperture. As such, a payload is suspended from a frame via one or more straps 316, 318, 320. In certain embodiments, large payloads may be suspended from multiple apertures 310, 312, 314. Because payloads are suspended from one or more apertures 310, 312, 314 of a frame, a payload deployment structure 302 is able to accommodate payloads having a wide variety of shapes and sizes.

After a payload is secured to a frame, a payload deployment device 300 can move to a particular location where the payload is to be deployed. Once there, the heating element associated with the appropriate aperture 310, 312, 314 to which the payload is suspended is energized. The heat from the heating element applies heat to the corresponding strap 316, 318, 320 which melts or otherwise severs the strap from the aperture 310, 312, 314, and the payload drops to the designated location. In various embodiments, a heating element may apply heat to completely melt or sever the strap 316, 318, 320. In other embodiments, a heating element may apply heat to partially melt or sever the strap 316, 318, 320 and the weight of the payload may further sever the strap so the payload drops.

In an embodiment, the amount of heat required to sever a strap depends on certain factors such as, for example, a melting point of the strap material, size or power of the payload deployment device to which the payload deployment structure is utilized, and the size of the payload. In various embodiments, the size and/or weight of a payload that can be deployed by a payload deployment system may depend on the type of the payload deployment device, the size of the payload deployment device and/or the like. For instance, in some embodiments it can be advantageous to limit a payload weight so as not to exceed 25% of the weight of a corresponding payload deployment device. Additional and/or alternate weight thresholds may be used within the scope of this disclosure.

Because the heating elements 116 can be separately and individually energized as show in FIG. 2, it is possible for a payload deployment system to deploy payloads at different locations. For instance, a payload deployment device may travel to a first a location and may deploy a first payload. Afterwards, the payload deployment device may travel to a second location and deploy a second payload.

As an example, a payload deployment system may be deploying radio repeaters or other radio transmitters. A heating element 116 for a first radio repeater may be energized, and the first radio repeater may be deployed at a first location. A payload deploying device may travel a certain distance until it receives a weak signal from the deployed radio repeater or until it no longer receives a signal from the deployed radio repeater, at which time a heating element for a second radio repeater may be energized and a second radio repeater may be deployed. As such, a payload deploying device may be able to extend its signal range by deploying radio repeaters. Alternatively, an onboard GPS system in the payload deploying device can be used to facilitate deployment of the payload at a plurality of predetermined locations. These predetermined locations can be stored in a memory 216 associated with the payload deploying device and/or may be determined by a remote operator.

In various embodiments, a frame of the payload deployment structure or other structure associated with the payload deployment device can include a video camera 322 that is mounted to the frame. The video camera can be mounted or arranged in a location selected so as to provide a visual perspective of one or more of the payloads. For instance, a video camera may be mounted to a portion of a frame near where the frame is mounted to a payload deployment device. The video camera may be mounted so that it is pointed downward toward the payload(s). As such, a video camera is used by an operator of a payload deployment device to view payload deployment. For example, images collected by the video camera can be communicated through the electrical interface 118 and then to the remote operator using data transceiver 212.

Figure 4:
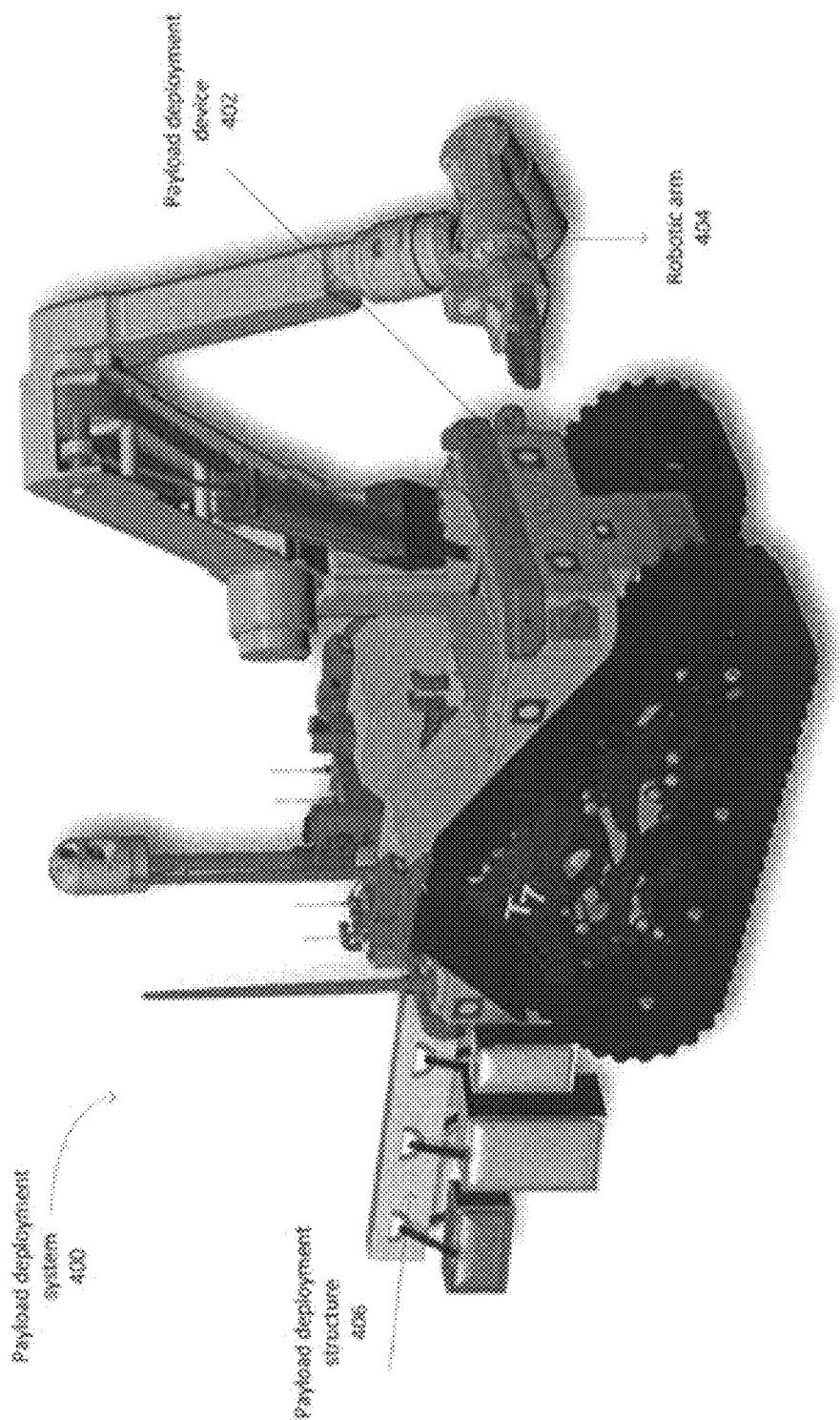
FIG. 4 a front perspective view of a robotic vehicle with an exemplary deployment system mounted thereon according to an embodiment.

In various embodiments, a payload deployment device may include a robotic arm as illustrated by FIG. 4. Payload deployment devices that have a robotic arm but not a payload deployment structure may use the robotic arm to deploy a payload. For example, the robotic arm may include grippers or other holders which may be used to carry a payload. However, if the robotic arm is being utilized for payload transport, it is unavailable for other functions such as, for example, opening doors. Further, an electrical connection to the payload deployment structure 330 would be provided through electrical contacts associated with the robotic arm, or through a separate wiring harness through which the control system of the payload deployment device can selectively apply electric current to the heating elements 116.

FIG. 4 illustrates a payload deployment system 400 having a payload deployment device 402 with a robotic arm 404 and a payload deployment structure 406. As illustrated by FIG. 4, a payload deployment structure 406 is mounted to a payload deployment device 402 on a portion of the payload deployment device opposite the portion where the robotic arm is located. This arrangement can leave the robotic arm clear of obstructions and also serves to improve the weight distribution on the chassis of the payload deployment device.

Figure 5:
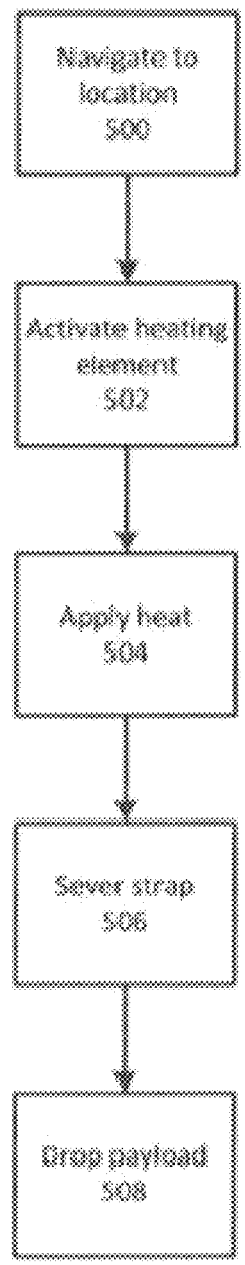
FIG. 5 is a flow chart that is useful for understanding an exemplary method of payload deployment according to an embodiment.

FIG. 5 illustrates an example method of payload deployment according to an embodiment. A payload deployment device has a payload deployment structure attached to it. The payload deployment structure has one or more payloads attached to it via straps attached to, secured to or routed through one or more apertures. As illustrated by FIG. 5, a payload deployment device navigates 500 to a particular location where a first payload is to be deployed. The payload deployment device may autonomously navigate 500 to the location, or it may be driven there by an operator. In the case on an unmanned payload deployment device, an operator may direct the payload deployment device to the location remotely such as, for example, using one or more controllers.

A heating element corresponding to the aperture to which the payload to be deployed is secured is activated or energized 502. An operator may activate 502 a heating element using one or more controllers such as, for example, by controlling a switch, pressing a button, or otherwise providing input indicating that the heating element is to be activated. In another embodiment, a heating element may automatically be activated 502 once a payload deployment device reaches a particular location. For instance, a payload deployment device and/or a payload deployment structure may include a location sensor such as, for example, a global positioning system (GPS) receiver. A location sensor may receive positional data from an external network, such as, for example a GPS network. Once a payload deployment device is at or near a particular location, as determined by a location sensor, a heating element may be automatically activated 502.

Once activated 502, a heating element applies 504 heat. The heat is applied 504 to the portion of the strap in contact with the heating element. In response to the application of heat to the strap, the strap will melt, burn, wear or otherwise at least partially sever 506. The payload attached to the strap drops 508 from the payload deployment structure and lands on the underlying surroundings such as, for example, the ground.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

We claim:

1. A payload deployment structure comprising:
   a frame having a first end, a second end, and a body extending from the first end toward the second end, wherein frame comprises:
      a mounting portion comprising a mechanical structure which is configured to engage a portion of a robotic vehicle such that the frame is supported on the robotic vehicle;
      at least a first aperture and a second aperture located along a length of the body, wherein the first and second apertures extend from a first surface of the frame to a second surface of the frame;
      a heating element located along a portion of an edge of each said first and second aperture, wherein the heating element is configured to be selectively electrically energized; and
      an electrical interface which is configured to receive one or more electrical signals from the robotic vehicle to facilitate selectively electrically energizing the heating element.

2. The payload deployment structure of claim 1, wherein the heating element is located along a bottom edge of the first or second aperture.

3. The payload deployment structure of claim 1, wherein the first or second aperture has a concave shape.

4. The payload deployment structure of claim 1, wherein the electrical interface of the payload deployment structure is integrated in the mounting portion.

5. The payload deployment structure of claim 4, wherein the robotic vehicle is an unmanned system.

6. The payload deployment structure of claim 4, wherein the robotic vehicle comprises a robotic arm, and the payload deployment structure is mounted to a portion of the robotic vehicle that is opposite of a location of the robotic arm.

7. The payload deployment structure of claim 1, further comprising a video camera mounted to the frame.

8. A payload deployment structure comprising:
   a frame having a first end, a second end, and a body extending from the first end toward the second end, wherein frame comprises:

a mounting portion comprising a mechanical structure which is configured to engage a portion of a robotic vehicle such that the frame is supported on the robotic vehicle;

an aperture located along a length of the body, wherein the aperture extends from a first surface of the frame to a second surface of the frame;

a heating element located along a portion of an edge of the aperture, wherein the heating element is configured to be selectively electrically energized; and an electrical interface which is configured to receive one or more electrical signals from the robotic vehicle to facilitate selectively electrically energizing the heating element; and a strap comprising:
a first portion secured to the frame via the aperture, wherein at least part of the first portion is in contact with the heating element, and a second portion secured to a payload such that the payload is suspended from the frame via the strap.

9. The payload deployment structure of claim 8, wherein the strap is fabricated from a meltable material.

10. The payload deployment structure of claim 9, wherein the heating element is configured to apply heat to the strap when energized.

11. The payload deployment structure of claim 8, wherein the payload comprises one or more of the following:
a communication device;
a parcel;
a sensor; and
a camera.

12. A payload deployment structure comprising:
a frame having a first end, a second end, and a body extending from the first end toward the second end, wherein frame comprises:
a mounting portion comprising a mechanical structure which is configured to engage a portion of a robotic vehicle such that the frame is supported on the robotic vehicle;

an aperture located along a length of the body, wherein the aperture extends from a first surface of the frame to a second surface of the frame;

a heating element located along a portion of an edge of the aperture, wherein the heating element is configured to be selectively electrically energized; and an electrical interface which is configured to receive one or more electrical signals from the robotic vehicle to facilitate selectively electrically energizing the heating element; and one or more other apertures located along the length of the body of the frame, wherein each other aperture has an other heating element located along a portion of an edge of the other aperture, wherein the other heating element is configured to be selectively electrically energized.

13. A payload deployment system comprising:
a payload deployment device; and
a payload deployment structure comprising a frame having a first end, a second end, and a body extending from the first end toward the second end, wherein frame comprises:
at least a first aperture and a second aperture located along a length of the body, wherein the first and second apertures extend from a first surface of the frame to a second surface of the frame, a heating element located along a portion of an edge of each said first and second aperture, wherein the heating element is configured to be selectively electrically energized, and a mounting portion,
wherein the payload deployment structure is connected to the payload deployment device via the mounting portion.

14. The payload deployment system of claim 13, wherein the payload comprises one or more of the following:
a communication device;
a parcel;
a sensor; and
a camera.

15. The payload deployment system of claim 13, wherein the heating element is located along a bottom edge of the first or second aperture.

16. The payload deployment system of claim 13, wherein the payload deployment device is an unmanned system.

17. The payload deployment system of claim 13, further comprising a camera mounted to the frame.

18. A payload deployment system comprising:
a payload deployment device; and
a payload deployment structure comprising a frame having a first end, a second end, and a body extending from the first end toward the second end, wherein frame comprises:
an aperture located along a length of the body, wherein the aperture extends from a first surface of the frame to a second surface of the frame, a heating element located along a portion of an edge of the aperture, wherein the heating element is configured to be selectively electrically energized, and a mounting portion;
wherein the payload deployment structure is connected to the payload deployment device via the mounting portion;

wherein the payload deployment structure further comprises:
a strap comprising:
a first portion secured to the frame via the aperture, wherein at least part of the first portion is in contact with the heating element, and a second portion secured to a payload such that the payload is suspended from the frame via the strap; and wherein the heating element is configured to apply heat to the strap when energized, and wherein the strap is fabricated from a meltable material.

19. A payload deployment system comprising:
a payload deployment device; and
a payload deployment structure comprising a frame having a first end, a second end, and a body extending from the first end toward the second end, wherein frame comprises:
an aperture located along a length of the body, wherein the aperture extends from a first surface of the frame to a second surface of the frame, a heating element located along a portion of an edge of the aperture, wherein the heating element is configured to be selectively electrically energized, and a mounting portion;
one or more other apertures located along the length of the body of the frame, wherein each other aperture has an other heating element located along a portion of an edge of the other aperture, wherein the other heating element is configured to be selectively electrically energized;

wherein the payload deployment structure is connected to the payload deployment device via the mounting portion.

20. A payload deployment system comprising:

a payload deployment device; and a payload deployment structure comprising a frame having a first end, a second end, and a body extending from the first end toward the second end, wherein frame comprises:

an aperture located along a length of the body, wherein the aperture extends from a first surface of the frame to a second surface of the frame, a heating element located along a portion of an edge of the aperture, wherein the heating element is configured to be selectively electrically energized, and a mounting portion, wherein the payload deployment structure is connected to the payload deployment device via the mounting portion;

wherein the payload deployment device comprises a robotic arm, and the payload deployment structure is mounted to a portion of the payload deployment device that is opposite of a location of a robotic arm.

* * * * *